United States Patent

Stefani

[15] 3,665,253

[45] May 23, 1972

[54] SHORT CIRCUIT PROTECTION DEVICE FOR MULTIPLE POWER SUPPLIES

[72] Inventor: Richard D. Stefani, Le Roy, N.Y.

[73] Assignee: GTE Sylvania Incorporated

[22] Filed: Dec. 2, 1970

[21] Appl. No.: 94,376

[52] U.S. Cl. ............................317/22, 317/31, 317/33 VR, 323/22 T
[51] Int. Cl. .........................................................H02h 7/20
[58] Field of Search ..............317/33 VR, 22, 36 TD, 38, 50, 317/31; 323/22 T

[56] References Cited

UNITED STATES PATENTS 3,229,164  1/1966  McCartney et al. ................317/33 VR
3,303,386  2/1967  Murphy ............................317/33 VR
3,582,713  6/1971  Till ..................................317/33 VR Primary Examiner—James D. Trammell
Attorney—Norman J. O'Malley, Elmer J. Nealon and Robert T. Orner

[57]  ABSTRACT

A short circuit protection device includes a surge protection circuit having first and second input connections coupled to a voltage source and a control circuit, respectively, and an output connection coupled to a plurality of voltage regulator circuits. The output voltages of the regulator circuit are sensed through a gate circuit by the control circuit. In the event one of the regulator output voltages goes to zero, the control circuit directs a control signal to the surge protection circuit which then disconnects the voltage source from the plurality of regulator circuits.

4 Claims, 2 Drawing Figures

INVENTOR.
RICHARD D. STEFANI
ATTORNEY

INVENTOR.
RICHARD D. STEFANI
ATTORNEY

3,665,253

SHORT CIRCUIT PROTECTION DEVICE FOR MULTIPLE POWER SUPPLIES

BACKGROUND OF THE INVENTION

This invention relates to protection devices for electronic circuitry and in particular to a protection device for protecting a primary power source against short circuit the base and voltage surge conditions external thereto.

Current limiting or short circuit protection is typically accomplished by connecting a resistor to the emitter of a series-pass transistor and by connecting a diode between the base of the transistor and the low voltage end of the resistor. The diode clamps the voltage across the resistor thereby limiting the current supplied by the transistor. When a short circuit occurs, the collector to emitter voltage drop $V_{CE}$ increases thereby causing the power dissipated within the pass transistor to increase greatly. The inherent disadvantages of the increased power dissipation are obvious.

The dissipation problem is further compounded in a system which requires a plurality of regulated voltage supplies, each of which must have short circuit protection. It would therefore be advantageous to have, and it is one of the objects of this invention to provide, a low power dissipation device for protecting a prime power source when a short circuit occurs in any one of a plurality of regulated voltage supplies coupled to the prime power source.

BRIEF SUMMARY OF THE INVENTION

A device according to the present invention for protecting a power source includes a surge protection circuit having an input connection coupled to the power source, an output connection coupled to a load, and a control terminal and is operative to couple the power source to the load. A voltage sensing means has an input connection coupled to the load and an output connection coupled to the control terminal of the surge protection circuit and is operative to direct a control signal to the surge protection circuit when the voltage at the load falls below a predetermined value. The surge protection circuit is operative to decouple the load from the power source in response to either a control signal at its control terminal or a surge at its input connection.

BRIEF DESCRIPTION OF THE DRAWINGS

The construction and operation of a device according to the present invention for protecting a power source against a short circuit condition will be more fully understood from the following detailed description taken in conjunction with the accompanying drawings in which.

DETAILED DESCRIPTION OF THE INVENTION

Figure 1:
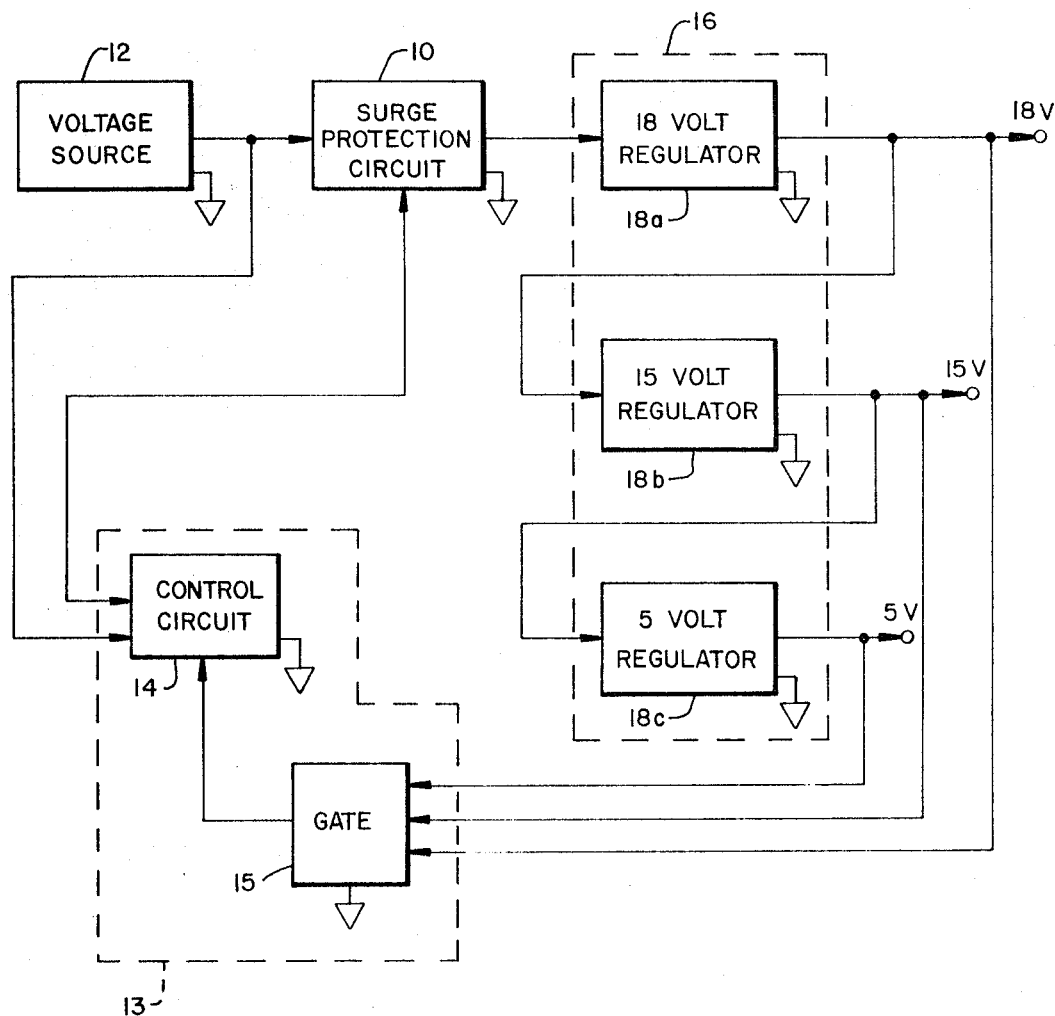
FIG. 1 is a block diagram of a power source protection circuit according to the invention.

An embodiment of a device according to the present invention for protecting a power source is shown in block diagram form in FIG. 1 and includes a surge protection circuit 10 (to be discussed in detail hereinafter) having an input connection coupled to a voltage source 12, such as any well-known direct current power supply, a control terminal coupled to a sensing means 13 including a control circuit 14 and a gate 15 and an output connection coupled to a load 16. The load 16 may, for example, include a plurality of voltage regulator circuits 18a–18 (three voltage regulator circuits are shown by way of example). The gate 15 has input connections from each of voltage regulator circuits 18a–18c and an output connection connected to the control circuit 14 (to be discussed in detail hereinafter).

Under quiescent operating conditions, prime power is supplied to the voltage regulators 18a–18c from the voltage source 12 via the surge protection circuit 10. The output voltages of the voltage regulators 18a–18c are sensed by the gate 15 (well-known in the art) which maintains a high output, for example 5.0 volts, when all three voltages are present at its input connections and drops to zero volts when any one of the input voltages goes to zero. In response to the zero volt level of the gate 15, the control circuit 14 directs a signal to the surge protection circuit 10 which, in turn, disconnects the load 16 from the voltage source 12.

Figure 2:
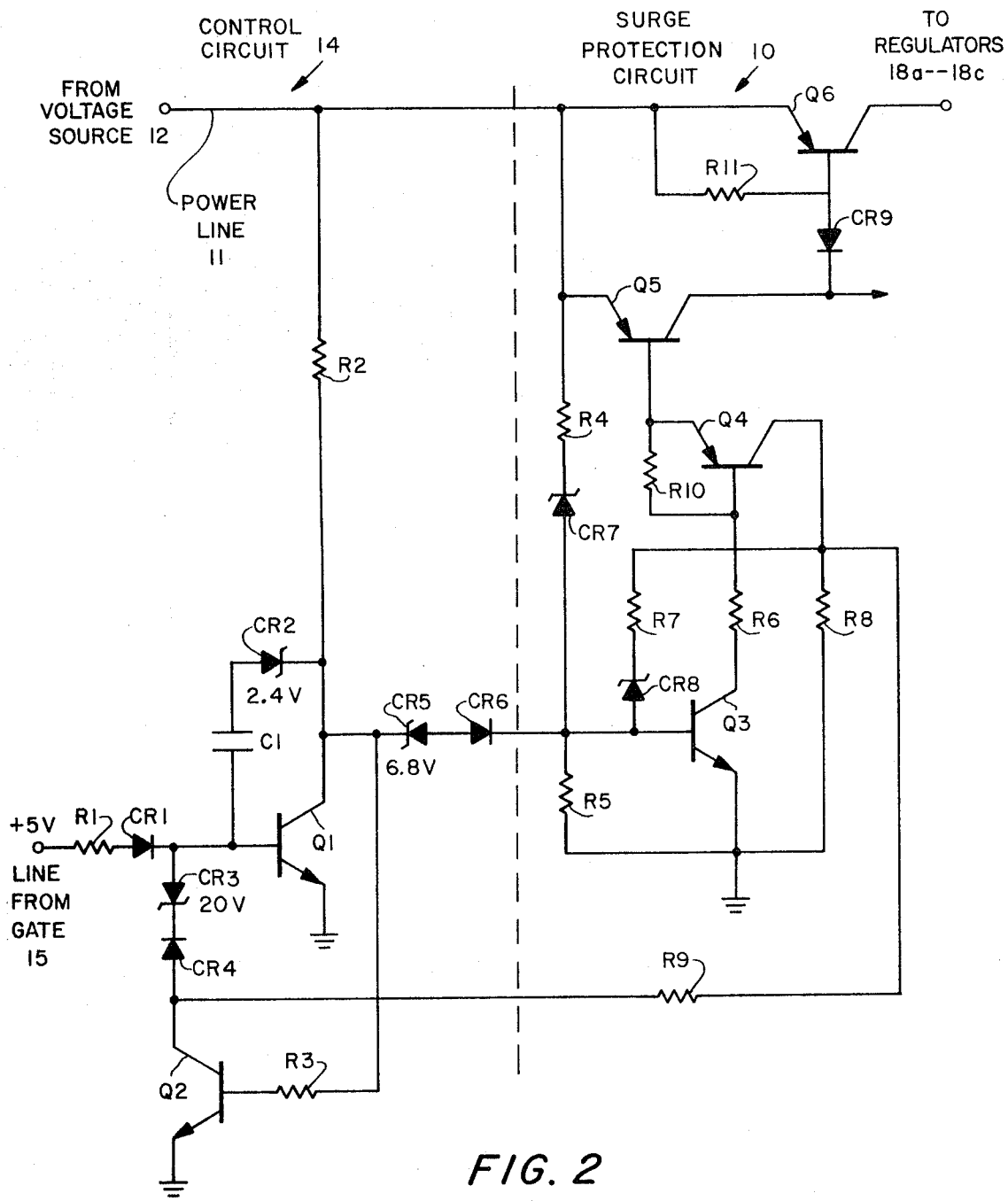
FIG. 2 is a schematic representation of the control circuit and surge protection circuit employed in the embodiment of FIG. 1.

A schematic diagram of an embodiment of the control circuit and surge protection circuit is shown in FIG. 2. The control circuit 14 includes a current limiting resistor R1 and an isolating diode CR1 connected between the gate 15 and the base of a first transistor Q1 (for example, an NPN type), the emitter of which is connected to a source of reference potential such as ground and the collector of which is connected through a load resistor R2 to the voltage source 12. A series combination of a feedback capacitor c1 and a zener diode CR2 is connected between the base and collector of the first transistor Q1.

A series combination of a second zener diode CR3 and a second isolating diode CR4 is connected between the base of the first transistor Q1 and the collector of a second transistor Q2 (for example, an NPN type), the emitter of which is grounded and the base of which is connected through a second limiting resistor R3 to the collector of the first transistor Q1. A series combination of a third zener diode CR5 and a third isolating diode CR6 is connected between the collector of the first transistor to the base of a third transistor Q3 (for example, an NPN type) of the surge protection circuit 10.

A series combination of a fourth resistor R4, a fourth zener diode CR7 and a fifth resistor R5 is connected between the voltage source 12 and ground. The base of the third transistor Q3 is connected to the common juncture of the fifth resistor R5 and the fourth zener diode CR7, the emitter is connected to ground, and the collector is connected through a sixth resistor R6 to the base of a fourth transistor Q4 (for example, a PNP type). A series combination of a fifth zener diode CR8, a seventh resistor R7 and an eighth resistor R8 is connected between the base of the third transistor Q3 and ground. Connected between the common juncture of the seventh and eighth resistors R7 and R8 and the collector of the second transistor Q2 is ninth resistor R9.

Also connected to the common juncture of the seventh and eighth resistors is the collector of the fourth transistor Q4, the emitter of which is connected to its base through a tenth resistor R10. The emitter of the fourth transistor Q4 is also connected to the base of a fifth transistor Q5 (for example, a PNP type), the emitter of which is connected to the voltage source 12 and the collector of which is connected through a fourth isolating diode CR9 to the common juncture of the base of a sixth transistor Q6 (for example, a PNP type) and an eleventh resistor R11. The emitter of the sixth transistor Q6 and the other end of the eleventh resistor R11 are connected to the voltage source 12 while the collector of the sixth transistor Q6 is connected to the regulators 18a–18c.

Under normal quiescent operating conditions, current flows from the 5.0 volt line (from the gate 15) through the first resistor R1 and the first isolating diode CR1 forcing the first transistor Q1 to saturate. No current flows through zener diode CR5 and the isolating diode CR6, and current is supplied from the source 12 to the regulators 18a–18c via power line 11 and the series transistor Q6. The second, third, fourth and fifth transistors Q2 through Q5 are normally off while the sixth transistor is normally on allowing current to flow from the voltage source 12 to the regulators 18a–18c.

When any one of the output power lines from the regulators 18a–18 is shorted to ground, the gate 15 changes state and the +5.0 volts is removed from the base circuit of the first transistor Q1. The first transistor Q1 is thus turned off allowing current to flow through the zener diode CR5 and the isolating diode CR6 to the surge protection circuit 10 which removes the regulators 18a–18c from the voltage source 12 in a manner to be discussed hereinbelow. During the short circuit condition, current also flows through the third resistor R3 to the base of the second transistor Q2 causing the transistor Q2 to saturate. No current flows through the zener diode CR3 forcing the first transistor Q1 to remain off. The zener diode CR2 allows the second transistor Q2 to saturate immediately after a short circuit condition exists by allowing the voltage at the collector of the transistor Q1 to rise immediately to the voltage of the zener diode CR2 before the capacitor C1 begins to charge. This forces current to flow to the base of the transistor Q2.

The capacitor C1 assures that the control circuit 14 will turn on when primary power is first applied by forcing the collector of the first transistor Q1 to remain below a predetermined voltage level, for example, 6.8 volts, until the 5.0 volt line is established. When the 5.0 volt line is established, the first transistor Q1 saturates and normal operation is again resumed.

The surge protection circuit 10 operates as follows. The control transistor Q6 is normally biased into saturation (the base current to saturate the control transistor Q6 can provide the necessary current to operate one of the regulator circuits). Circuit protection from either a power line surge or a regulator short circuit condition is achieved by turning the control transistor Q6 off.

When a power line transient raises the voltage at the cathode of the zener diode CR7 to a predetermined level, for example 33.0 volts, the control transistor Q6 is turned off in the following manner. Current flows through the fourth resistor R4 and the zener diode CR7 to the base of the third transistor Q3 which is turned on allowing current to flow from the power line 11 through the emitter-base junctions of the fifth and fourth transistors Q5 and Q4. The current is sufficient to saturate the fourth and fifth transistors Q4 and Q5. The saturation of the fifth transistor stops the current flow in the emitter-base junction of the control transistor Q6 which, in turn, disconnects the regulator circuits 18a–18c from the power line 11.

During a surge condition, current flows from the collector of the transistor Q4, the seventh resistor R7 and the zener diode CR8 to the base of the transistor Q3 (the function of the resistor R7 and the zener diode CR8 will be explained hereinafter). Current also flows from the collector of the transistor Q4 through the resistor R9, the isolating diode CR4 and the zener diode CR3 to the base of the transistor Q1. Thus the first transistor Q1 remains saturated during the power line surge duration even though the voltage from the gate 15 is absent. Thus the first transistor circuit is inhibited from generating a signal at the base of transistor Q3.

The condition of the circuit remains as described above until the power line surge drops below the knee of the zener diode CR7 ($\approx$33.0 volts). While current stops flowing through the zener diode CR7, it continues to flow through the zener diode CR8 and the transistor Q3 remains saturated until the surge drops below the knee of the zener diode CR8 ($\approx$30.0 volts). Current stops flowing through the zener diode CR8 and the transistor Q3 is turned off. The fourth and fifth transistors Q4 and Q5 turn off allowing base current to flow through the control transistor Q6 and normal operation is again resumed.

There is a time delay between the time the transistor Q4 turns off and the time that the gate voltage from gate 15 is reestablished. When the transistor Q4 turns off, current stops flowing through the zener diode CR3 and the transistor Q1 is turned off. The capacitor C1 slows down the turn-off time of the transistor Q1. The collector of the transistor Q1 remains below 6.8 volts during the time that the +5.0 volt line from the gate is being established. Once established, current again flows through the resistor R1 and the diode CR1 to the base of the transistor Q1 which then saturates. If the transistor Q1 were allowed to turn off immediately after the transistor Q4 turns off, current would flow through the resistor R2, the zener diode CR5 and the diode CR6 to the base of the transistor Q3. The transistor Q3 would then saturate turning off the transistor Q6 again.

The resistor R7 and the zener diode CR8 allow the surge protector circuit 10 to activate at a voltage slightly higher ($\approx$3.0 volts) than the deactivation voltage thus preventing the small transients on the power line from reactivating the surge protector circuit 10. When transistor Q6 saturates, after a power line surge condition, an in-rush of current comes from the power line through the transistor Q6 to regulator circuits 18a–18. The current in-rush is caused by charging of the capacitors associated with the regulators. Once the capacitors (not shown) are charged, the current drops to the normal load value.

Current, under quiescent conditions, flows from the +5.0 volts line through the resistor R1 and the isolating diode CR1 forcing the transistor Q1 to saturate. If any of the regulators 18a–18 have their output lines shorted to ground, the +5.0 volt line drops to zero causing the transistor Q1 to turn off and allowing current to flow through the zener diode CR5 and the isolating diode CR6 to the base of the transistor Q3. The surge protection circuit 10 is then activated in the manner described hereinabove. The zener diode CR2 allows current to flow, immediately after a short circuit condition exists, from the collector of the transistor Q1 through the resistor R3 to the base of the transistor Q2. The transistor Q2 saturates and prevents current from flowing through the zener diode CR3.

While there has been shown and described what is considered a preferred embodiment of the present invention, various modifications may be made therein without departing from the invention as defined by the appended claims.

What is claimed is:

1. A device for protecting a power source comprising:
   a load having an output voltage associated therewith;
   a surge protection circuit having an input connection coupled to said power source, an output connection coupled to said load, and a control terminal and being operative to couple energy from said power source to said load; and
   voltage sensing means having an input connection coupled to said load and an output connection coupled to the control terminal of said surge protection circuit and being operative to direct a control signal to said control terminal when the output voltage at said load falls below a predetermined value;
   said surge protection circuit being operative in response to the control signal at its control terminal from said voltage sensing means to decouple said load from said power source and being operative in response to a surge condition at its input connection to decouple said load from said power source;
   said voltage sensing means including
      means having an input connection coupled to said load and an output connection and being operative to generate an output signal at its output connection when an output voltage less than a predetermined level occurs at the input connection, and
      first transistor circuit means having an input connection connected to the output connection of said last-mentioned means and an output connection coupled to the control terminal of said surge protection circuit and being operative in response to the output signal from said last-mentioned means to generate said control signal;
   means coupled between said surge protection circuit and the input connection of said first transistor circuit means, for rendering said first transistor circuit means nonresponsive to a signal from said surge protection circuit during said surge condition; and
   second transistor circuit means having an input connection and an output connection connected to the output connection and input connection, respectively, of said first transistor circuit means and being operative to render said first transistor circuit means nonresponsive to signals at its input connection after said control signal is generated by said first transistor.

2. A device for protection a power source according to claim 1 wherein:

said load includes a plurality of regulated voltage supplies each having an input connection coupled to said surge protection circuit and an output connection coupled to said voltage sensing means and being operative to generate a regulated output voltage; and said means in said voltage sensing means includes gating means having an input connection coupled to each of said regulated supplies and an output connection connected to the input connection of the first transistor circuit means and being operative to generate an output signal at its output connection if any one of the output voltages is less than a predetermined level.

3. A device for protecting a power source according to claim 2 wherein said surge protection circuit includes:

third transistor circuit means, coupled between said power source and said plurality of regulated voltage supplies, having a control element and being operative in response to a control signal at its control element to decouple said power source from said plurality of regulated voltage supplies;

fourth transistor circuit means having an input connection coupled to said power source and to said control terminal and an output connection and being operative in response to either a surge at said power source or a signal from said first transistor circuit means to change from a first condition to a second condition at its output connection; and fifth transistor circuit means having an input connection coupled to the output connection of said fourth transistor and an output connection coupled to the control element of said third transistor circuit means and being operative in response to the second condition of said fourth transistor circuit means to generate said control signal at the control element of said third transistor circuit means.

4. A device for protecting a power source according to claim 3 further including a sixth transistor circuit means having an input connection coupled to the output connection of said fourth transistor circuit means and an output connection coupled to the input connection of said first transistor means and being operative in response to the second condition at the output connection of said fourth transistor circuit means caused by the surge at said power source to inhibit the generation of a control signal at said control terminal.

* * * * *